US006767931B2

(12) United States Patent
Martinez et al.

(10) Patent No.: US 6,767,931 B2
(45) Date of Patent: Jul. 27, 2004

(54) FOAM COMPOSITIONS FROM BLEND OF ALKENYL AROMATIC POLYMERS AND ALPHA-OLEFIN/VINYL OR VINYLIDENE AROMATIC INTERPOLYMERS

(75) Inventors: Felipe Martinez, Houston, TX (US); Antonio Batistini, Horgen (CH); Jerker B. L. Kjellqvist, Wädenswil (CH); Ronald Wevers, Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 17 days.

(21) Appl. No.: 10/332,683

(22) PCT Filed: Jul. 10, 2001

(86) PCT No.: PCT/US01/21696

§ 371 (c)(1),
(2), (4) Date: Jan. 9, 2003

(87) PCT Pub. No.: WO02/08332

PCT Pub. Date: Jan. 31, 2002

(65) Prior Publication Data

US 2003/0212159 A1 Nov. 13, 2003

Related U.S. Application Data

(60) Provisional application No. 60/219,565, filed on Jul. 20, 2000.

(51) Int. Cl.[7] ............... C08J 9/00; C08J 9/18; C08J 9/20
(52) U.S. Cl. ............ 521/139; 521/59; 521/60; 521/79; 521/81; 525/240
(58) Field of Search ............ 521/81, 59, 60, 521/79, 139; 525/240

(56) References Cited

U.S. PATENT DOCUMENTS

| 3,644,230 A | 2/1972 | Cronin |
| 3,651,183 A | 3/1972 | Hosoda et al. |
| 4,214,054 A | 7/1980 | Watanabe et al. |
| 5,055,438 A | 10/1991 | Canich |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,189,192 A | 2/1993 | LaPointe et al. |
| 5,244,996 A | 9/1993 | Kawasaki et al. |
| 5,272,236 A | 12/1993 | Lai et al. |
| 5,278,272 A | 1/1994 | Lai et al. |
| 5,321,106 A | 6/1994 | LaPointe |
| 5,347,024 A | 9/1994 | Nickias et al. |
| 5,350,723 A | 9/1994 | Neithamer et al. |
| 5,374,696 A | 12/1994 | Rosen et al. |
| 5,380,810 A | 1/1995 | Lai et al. |
| 5,399,635 A | 3/1995 | Neithamer et al. |
| 5,460,818 A | 10/1995 | Park et al. |
| 5,470,993 A | 11/1995 | Devore et al. |
| 5,652,315 A | 7/1997 | Inoue et al. |
| 5,703,187 A | 12/1997 | Timmers |
| 5,708,084 A | 1/1998 | Hauenstein et al. |
| 5,721,185 A | 2/1998 | LaPointe et al. |
| 5,869,591 A | 2/1999 | McKay et al. |
| 5,883,213 A | 3/1999 | Arai et al. |
| 5,908,896 A * | 6/1999 | Mayer et al. ............ 524/596 |
| 5,916,952 A | 6/1999 | Romenesko et al. |
| 6,013,217 A | 1/2000 | Hauenstein et al. |
| 6,080,489 A * | 6/2000 | Mehta ............ 428/447 |
| 6,133,333 A * | 10/2000 | Chaudhary et al. ........ 521/139 |
| 6,231,795 B1 * | 5/2001 | Chaudhary et al. ........ 264/53 |
| 6,335,341 B1 * | 1/2002 | Johnson et al. ........ 514/252.18 |

FOREIGN PATENT DOCUMENTS

| EP | 0 416 815 B1 | 8/1997 |
| EP | 0 514 828 B1 | 11/1997 |
| EP | 0 778 852 B1 | 10/1999 |
| EP | 0 852 596 B1 | 6/2000 |
| WO | WO-94/00500 A1 | 1/1994 |
| WO | WO-95/32095 A1 | 11/1995 |
| WO | WO-98/09999 A2 | 3/1998 |
| WO | WO-00/34363 A1 | 6/2000 |
| WO | WO-01/12708 A1 | 2/2001 |

OTHER PUBLICATIONS

International Search Report, Nov. 19, 2001, PCT/US01/21696.

* cited by examiner

Primary Examiner—Morton Foelak

(57) ABSTRACT

A foamable polymer composition is described which comprises: a1) a substantially random interpolymer produced from: i) one or more α-olefin monomers; and ii) one or more vinyl or vinylidene aromatic monomers and/or one or more sterically hindered aliphatic or cycloaliphiatic vinyl or vinylidene monomers; and optionally iii) other polymerizable ethylenically unsaturated monomer(s); or a2) an interpolymer comprising polymerized units of ethylene and vinyl acetate; or a3) a combination of the polymers a1) and a2); and b) a polydiorganosiloxane having a viscosity of at least one million centistoke at 25° C.; and c) a foaming agent. The polydiorganosiloxane is useful for improving the abrasion resistance of foams comprising the substantially random interpolymer a1) and/or the ethylene/vinyl acetate interpolymer a2).

18 Claims, No Drawings

FOAM COMPOSITIONS FROM BLEND OF ALKENYL AROMATIC POLYMERS AND ALPHA-OLEFIN/VINYL OR VINYLIDENE AROMATIC INTERPOLYMERS

This application is a 371 of PCT/US01/21696 filed Jul. 10, 2001, which claims the benefit of Provisional application Ser. No. 60/219,565, filed Jul. 20, 2000.

BACKGROUND OF THE INVENTION

This invention relates to foamable polymer compositions comprising a1) a substantially random interpolymer produced from i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s), or a2) an interpolymer comprising polymerized units of ethylene and vinyl acetate or a3) a combination of the polymers a1) and a2) and a high molecular weight polysiloxane.

Foamable compositions comprising ethylene/vinyl acetate polymers are well known and widely used for making footwear, such as shoe soles. Substantially random interpolymers a1) and their use for producing foams are described in U.S. Pat. No. 5,460,818. From such polymers, foamed articles can be produced which are generally soft, flexible and resilient. They can also be hard, that means less resilient and less flexible, and exhibit high compression set. Accordingly, the above-mentioned interpolymers can be potentially used in many applications, such as tarps, coated fabrics, shoe soles, shoe stiffeners, and artificial leather, tires for bicycles, wheel chairs, and stroller wheels, and in wire and cable insulation and jacketing formed by general extrusion or by calendered sheets or films with and without fillers. Some of the shoe soles and wheels are produced via injection molding and cross-linking processes where usually ethylene/vinyl acetate polymers are hard to control since they tend to stick to molds and to expand unevenly.

For many of these applications, such as shoe soles, wheels and wire and cable insulation, it is important that the flexible articles also have a good surface abrasion resistance. In some applications like shoe soles, a high coefficient of friction (COF) is also desirable. An unduly low coefficient of friction increases the danger of slipping on the ground.

Accordingly, one object of the present invention is to improve the surface abrasion resistance of foams comprising the above-mentioned interpolymers. A preferred object of the present invention is to improve the surface abrasion resistance of such foams without decreasing their coefficient of friction.

SUMMARY OF THE INVENTION

One aspect of the present invention is a foamable polymer composition which comprises a1) a substantially random interpolymer produced from i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s), or
a2) an interpolymer comprising polymerized units of ethylene and vinyl acetate or
a3) a combination of the polymers a1) and a2); and
b) a polydiorganosiloxane having a viscosity of at least one million centistoke at 25° C.; and
c) a foaming agent.

Another aspect of the present invention is a foam comprising a1) a substantially random interpolymer produced from i) one or more α-olefin monomers and ii) one or more vinyl or vinylidene aromatic monomers and/or one or more stenically hindered aliphatic or cycloaliphatic vinyl or vinylidene monomers, and optionally iii) other polymerizable ethylenically unsaturated monomer(s), or
a2) an interpolymer comprising polymerized units of ethylene and vinyl acetate or
a3) a combination of the polymers a1) and a2); and
b) a polydiorganosiloxane having a viscosity of at least one million centistoke at 25° C.

Yet another aspect of the present invention is a process for producing a foam wherein the above-mentioned foamable polymer composition is exposed to an elevated temperature to release blowing agent and to form a foam structure.

Yet another aspect of the present invention is a fabricated article comprising the above-mentioned foam.

Yet another aspect of the present invention is a method of improving the abrasion resistance of a foam comprising:

a1) a substantially random interpolymer produced from i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s), or
a2) an interpolymer comprising polymerized units of ethylene and vinyl acetate or
a3) a combination of the polymers a1) and a2); which method comprises the step of incorporating into said foam an effective amount of a polydiorganosiloxane having a viscosity of at least one million centistoke at 25° C.

DETAILED DESCRIPTION OF THE INVENTION

The term "comprising" as used herein means "including". The term "comprising" is not to be understood to mean "consisting of".

The term "interpolymer" is used herein to indicate a polymer wherein at least two different monomers are polymerized to make the interpolymer.

The term "substantially random" in the substantially random interpolymer resulting from polymerizing i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, α-olefin monomers containing from 2 to about 20, preferably from 2 to about 12, more preferably from 2 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. Most preferred are ethylene or a combination of ethylene with $C_{3-8}$-α-olefins. These α-olefins do not contain an aromatic moiety.

Optional other polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the substantially random interpolymer include, for example, those represented by the following Formula I

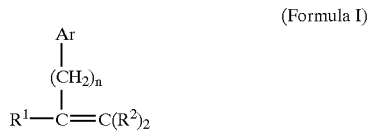

(Formula I)

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from halo, $Cl_4$-alkyl, and $C_{1-4}$-haloalkyl; and n has a value from zero to about 4, preferably from zero to 2, most preferably zero. Particularly suitable monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, t-butyl styrene, the ring halogenated styrenes, such as chlorostyrene, para-vinyl toluene or mixtures thereof. A more preferred aromatic monovinyl monomer is styrene.

By the term "sterically hindered aliphatic or cycloaliphatic vinyl or vinylidene monomers", it is generally meant the addition of polymerizable vinyl or vinylidene monomers corresponding to Formula II

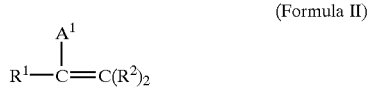

(Formula II)

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently hydrogen or an alkyl radical containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to about 20 carbon atoms and having a linear aliphatic structure, such as propylene, butene-1, hexene-1 and octene-1, are not considered as sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl- or aryl-substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

If the substantially random interpolymer contains a vinyl or vinylidene aromatic monomer and a sterically hindered aliphatic or cycloaliphatic monomer in polymerized form, the weight ratios between these two monomer types is generally not critical. Preferably, the substantially random interpolymer contains either a1) one or more vinyl or vinylidene aromatic monomers or b) one or more sterically hindered aliphatic or cycloaliphatic monomers. Vinyl or vinylidene aromatic monomers are preferred over sterically hindered aliphatic or cycloaliphatic monomers.

The preferred substantially random interpolymers are the so-called pseudo-random interpolymers as described in EP-A-0,416,815 by James C. Stevens et al. and U.S. Pat. No. 5,703,187 by Francis J. Timmers, both of which are incorporated herein by reference in their entirety.

The most preferred substantially random interpolymers are interpolymers of ethylene and styrene and interpolymers of ethylene, styrene and at least one α-olefin containing from 3 to 8 carbon atoms.

The substantially random interpolymers usually contain from about 35 to about 99.5, preferably from about 45 to about 99, more preferably from about 50 to about 98 mole percent of at least one aliphatic α-olefin and from about 0.5 to about 65, preferably from about 1 to about 55, more preferably from about 2 to about 50 mole percent of at least one vinyl or vinylidene aromatic monomer and/or sterically hindered aliphatic or cycloaliphatic vinyl or vinylidene monomer. The percentage of the vinyl or vinylidene aromatic monomer and/or sterically hindered aliphatic or cycloaliphatic vinyl or vinylidene monomer can be determined by NMR.

The substantially random interpolymers usually contain from 0 to about 20 mole percent of other polymerizable ethylenically unsaturated monomer(s).

The melt index I2 according to ASTM D 1238 Procedure A, condition E, generally is from about 0.01 to about 50 g/10 minutes, preferably from about 0.01 to about 20 g/10 minutes, more preferably from about 0.1 to about 10 g/10 minutes, and most preferably from about 0.5 to about 5 g/10 minutes. The glass transition temperature (Tg) of the substantially random interpolymers is preferably from about −40° C. to about +35° C., preferably from about 0° C. to about +30° C., most preferably from about +10° C. to about +25° C., measured according to differential mechanical scanning (DMS). The density of the substantially random interpolymer is generally about 0.930 g/cm³ or more, preferably from about 0.930 to about 1.045 g/cm³, more preferably from about 0.930 to about 1.040 g/cm³, most preferably from about 0.930 to about 1.030 g/cm³. The molecular weight distribution, $M_w/M_a$ is generally from about 1.5 to about 20, preferably from about 1.8 to about 10, more preferably from about 2 to about 5.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the substantially random interpolymer, if desired, by extraction techniques such as selective precipitation from solution with a nonsolvent for either the substantially random interpolymer or the vinyl or vinylidene aromatic homopolymer. For the purpose of the present invention it is preferred that no more than 30 weight percent, preferably less than 20 weight percent, most preferably less than 10 weight percent, based on the total weight of the substantially random interpolymers of atactic vinyl or vinylidene aromatic homopolymer is present.

The substantially random interpolymer may be modified by typical grafting, hydrogenation, functionalizing, or other reactions well known to those skilled in the art. The polymer may be readily sulfonated or chlorinated to provide functionalized derivatives according to established techniques. The substantially random interpolymer may also be modified by various chain extending or cross-linking processes including, but not limited to peroxide-, silane-, sulfur-, radiation-, or azide-based cure systems. A full description of the various cross-linking technologies is described in U.S. Pat. No. 5,869,591 and EP-A-778,852, the entire contents of both of which are herein incorporated by reference. Dual cure systems, which use a combination of heat, moisture cure, and radiation steps, may be effectively employed. Dual cure systems are disclosed and claimed in EP-A-852,596, incorporated herein by reference. For instance, it may be desirable to employ peroxide crosslinking agents in conjunction with silane crosslinking agents, peroxide crosslinking agents in conjunction with radiation, and sulfur-containing crosslinking agents in conjunction with silane crosslinking agents. The substantially random interpolymer may also be modified by various cross-linking processes including, but not limited to the incorporation of a diene component as a termonomer in its preparation and subsequent cross-linking by the aforementioned methods and further methods including vulcanization via the vinyl group using sulfur for example as the cross linking agent.

A preferred method of preparation of the substantially random interpolymer includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from -30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymer are disclosed in EP-A-514,828; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl(idene) aromatic interpolymer can also be prepared by the methods described in JP 07/278,230 employing compounds shown by the general Formula III

(Formula III)

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1 to 12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl(idene) aromatic interpolymer can also be prepared by the methods described by John G. Bradfute et al. (W.R. Grace & Co.) in WO 95/32095; by R. B. Pannell (Exxon Chemical Patents, Inc.) in WO 94/00500; and in Plastics Technology, page 25 (September 1992).

Also suitable are the substantially random interpolymers which comprise at least one α-olefin/vinyl aromatic/vinyl aromatic/α-olefin tetrad disclosed in WO-98/09999-A by Francis J. Timmers et al. These interpolymers can be prepared by conducting the polymerization at temperatures of from about -30° C. to about 250° C. in the presence of catalysts as those disclosed in WO-98/09999-A. Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl)zirconium 1,4diphenyl-1,3-butadiene, racemic-(dimethylsilanediyl)-bis-(2-methyl-4-phenylindenyl)zirconium di-C1–4 alkyl, racemic-(dimethylsilanediyl)-bis-(2-methyl-4-phenylindenyl) zirconium di-C1–4 alkoxide, or any combination thereof. It is also possible to use the following titanium-based constrained geometry catalysts, [N-(1,1-dimethylethyl)-1,1-dimethyl-1-[(1,2,3,4,5-h)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-h)-1-indenyl)(tert-butylamido) dimethylsilane titanium dimethyl; and ((3-isopropyl)(1,2,3,4,5-h)-1-indenyl)(tert-butyl amido)dimethylsilane titanium dimethyl, or any combination thereof.

Further preparative methods for the substantially random interpolymers used in the present invention have been described in the literature. Longo and Grassi (*Makromol. Chem.*, Volume 191, pages 2387 to 2396 [1990]) and D'Anniello et al. (*Journal of Applied Polymer Science*, Volume 58, pages 1701 to 1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer*

Preprints, *Am.Chem.Soc., Div.Polym.Chem.*, volume 35, pages 686, 687 [1994]) have reported copolymerization using a $MgCl_2/TiCl_4/NdCl_3/Al(iBu)_3$ catalyst to give random copolymers of styrene and propylene. Lu et al. (Journal of Applied Polymer Science, volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, volume 197, pages 1071 to 1083 [1997]) have described the influence of polymerization conditions on the copolymerization of styrene with ethylene using $Me_2Si(Me_4Cp)(N\text{-}tert\text{-}butyl)TiCl_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.* Volume 38, pages 349, 350 [1997], U.S. Pat. No. 5,883,213 and DE 197 11 339 A1) and in U.S. Pat. No. 5,652,315, issued to Mitsui Toatsu Chemicals, Inc. The manufacture of o-olefin/vinyl aromatic monomer interpolymers such as propylene/styrene and butene/styrene are described in U.S. Pat. No. 5,244,996, issued to Mitsui Petrochemical Industries Ltd. or U.S. Pat. No. 5,652,315 also issued to Mitsui Petrochemical Industries Ltd. or as disclosed in DE 197 11 339 A1 to Denki Kagaku Kogyo KK. All the above methods disclosed for preparing the substantially random interpolymer are incorporated herein by reference. The polymer composition of the present invention may contain one or more types of substantially random interpolymers a1).

The substantially random interpolymer a1) can be partially or fully replaced by an interpolymer a2) comprising polymerized units of ethylene and vinyl acetate. The interpolymer a2) preferably comprises from 4 to 40 weight percent, more preferably from 12 to 35 weight percent, most preferably from 15 to 30 weight percent, of vinyl acetate units and from 60 to 96 weight percent, more preferably from 88 to 65 weight percent, most preferably from 85 to 70 weight percent of ethylene units. The melt index I2 according to ASTM D 1238 Procedure A, condition E, of the interpolymer a2) preferably is from 0.05 to 100 g/10 min., more preferably from 0.1 to 60 g/10 min., most preferably from 0.5 to 10 g/10 min. The interpolymer a2) comprising polymerized units of ethylene and vinyl acetate may be grafted. In the preferred embodiment of the present invention, the interpolymer a2) is not grafted.

If both interpolymers a1) and a2) are incorporated in the foamable polymer composition of the present invention, their amounts preferably are from 15 to 85, more preferably from 25 to 75, most preferably from 40 to 60 weight percent of the substantially random interpolymer a1), and from 85 to 15, preferably from 75 to 25, most preferably from 60 to 40 weight percent of the interpolymer a2), the weight percentages being based on the total weight of the interpolymers a1) and a2).

The foamable polymer composition of the present invention preferably comprises from about 0.01 to about 20 weight percent, more preferably from about 0.1 to about 10 weight percent, and most preferably from about 0.5 to about 5 weight percent of one or more polydiorganosiloxanes b), based on the total weight of the polymers in the composition. The polydiorganosiloxane b) has a viscosity of at least one million centistoke ($mm^2$/sec.), generally at least 2 millions centistoke, preferably at least 5 millions centistoke, more preferably at least 10 millions centistoke and most preferably at least 15 millions centistoke, measured at 25° C. The upper viscosity limit is not critical. The viscosity is generally up to 50 millions centistoke, preferably up to 40 millions centistoke, more preferably up to 30 millions centistoke, most preferably up to 25 millions centistoke, measured at 25° C. If the polydiorganosiloxane b) has a viscosity of less than one million centistoke, measured at 25° C., the coefficient of friction of the polymer composition is reduced. The consistency of the polydiorganosiloxane b) should preferably be that of a gum.

The organic groups in the polydiorganosiloxanes are independently selected from hydrocarbon or halogenated hydrocarbon groups such as alkyl and substituted alkyl groups containing from 1 to 20 carbon atoms; or alkenyl groups, such as vinyl and 5-hexenyl; cycloalkyl groups, such as cyclohexyl; and aromatic hydrocarbon groups, such as phenyl, benzyl and tolyl. Preferred organic groups are lower alkyl groups containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Preferred polydiorganosiloxanes include polydimethylsiloxane homopolymers, copolymers consisting essentially of dimethylsiloxane units and methylphenylsiloxane units, copolymers consisting essentially of diphenylsiloxane units and methylphenylsiloxane units, and homopolymers of methylphenylsiloxane units. The polymer composition of the present invention may contain one or more types of polydiorganosiloxanes b).

The polydiorganosiloxane b) generally contains at least one, preferably two or more hydroxyl groups, amine groups or vinyl groups. Most preferred are the hydroxyl groups or vinyl groups. These groups may be located at the ends of the molecule or they may be distributed along the chain or they may be located both at the ends as well as along the chain. Preferably these groups reside at the molecular chain ends, as in the case of hydroxyl, in the form of diorganohydroxysiloxy groups, such as dimethylhydroxysiloxy, diphenylhydroxysiloxy or methylphenylhydroxysiloxy. When the hydroxyl groups, amine groups or vinyl groups are located only along the chain, the terminal groups of the polydiorganosiloxane may be any non-reactive moiety, typically a di- or triorganosiloxy species, such as dimethylvinylsiloxy or trimethylsiloxy. The polydiorganosiloxane b) is preferably a linear polydimethylsiloxane containing up to about 50 mole percent of phenyl units. Most preferably, it is a polydimethylsiloxane homopolymer having dimethylhydroxysiloxy end groups. The polydiorganosiloxanes b) are well known in the art, and many such homopolymers and copolymers are commercially available, for example from Dow Corning. The polydiorganosiloxanes b) are for example described in U.S. Pat. Nos. 5,708,084, 5,916,952 and 6,013,217.

The polydiorganosiloxanes b) do not include the lower molecular weight materials, such as SFR-100 Silicone, available from General Electric Company, which are usually referred to as silicones or silicone oils. These lower molecular weight materials generally have viscosities of less than 1,000 centistoke ($mm^2$/sec.) at 25° C. and are used as mold release agents or have viscosities ranging from 10,000 centistoke to 60,000 centistoke ($mm^2$/sec.) at 25° C. and are used as internal additives in thermoplastic polymers to give processing advantages and surface property, such as reduced coefficient of friction, improved abrasion resistance, lower wear rates, mold release or faster mold cycles. These materials of lower viscosity have to be distinguished from the described polydiorganosiloxanes b) of higher viscosity that are usually referred to as polydiorganosiloxanes gums.

Furthermore, the foamable polymer composition of the present invention may comprise up to about 70 weight percent, preferably up to about 50 weight percent, more preferably up to about 35 weight percent, of one or more polymeric components other than interpolymers a1) and/or a2), based on the total weight of the polymers in the composition. These polymeric components may be added to modify the properties of the foams of the present invention, such as to improve the tear resistance, to increase the compression set properties at very low foam density, or to modify the tensile strength or modulus of the foam.

Preferred additional, optional polymers are monovinyl or monovinylidene aromatic polymers or styrenic block copolymers or homopolymers or interpolymers of aliphatic α-olefins having from 2 to 20 carbon atoms or α-olefins having from 2 to 20 carbon atoms and containing polar groups.

Suitable monovinyl or monovinylidene aromatic polymers include homopolymers or interpolymers of one or more monovinyl or monovinylidene aromatic monomers, or interpolymers of one or more monovinyl or monovinylidene aromatic monomers and one or more monomers interpolymerizable there with other than an aliphatic α-olefin. Suitable monovinyl or monovinylidene aromatic monomers are represented by the following formula:

Formula IV

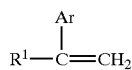

wherein $R^1$ and Ar have the meanings stated in formula I further above. Exemplary monovinyl or monovinylidene aromatic monomers are those listed under formula I further above, particularly styrene. Preferred is high impact polystyrene (HIPS).

Examples of suitable interpolymerizable comonomers other than a monovinyl or monovinylidene aromatic monomer include, for example, $C_4$–$C_6$ conjugated dienes, especially butadiene or isoprene. In some cases, it is also desirable to copolymerize a cross-linking monomer such as a divinyl benzene into the monovinyl or monovinylidene aromatic polymer. Preferred are styrene-butadiene rubbers (SBR), such as high styrene SBR, which is for example available under the trademark Pliolite from Goodyear.

The polymers of monovinyl or monovinylidene aromatic monomers with other interpolymerizable comonomers preferably contain, polymerized therein, at least 50 percent by weight and, preferably, at least 90 percent by weight of one or more monovinyl or monovinylidene aromatic monomers.

Styrenic block polymers are also useful as an additional, optional polymer in the polymeric layer (B). The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. Suitable block copolymers having unsaturated rubber monomer units include, but are not limited to, styrene-butadiene (SB), styrene-isoprene (SI), styrene-butadiene-styrene block copolymers (SBS), styrene-isoprene-styrene (SIS), ac-methylstyrene-butadiene-α-methylstyrene or α-methylstyrene-isoprene-α-methylstyrene. The styrenic portion of the block copolymer is preferably a polymer or interpolymer of styrene and its analogs and homologs including α-methylstyrene and ring-substituted styrenes, particularly ring-methylated styrenes.

Other preferred additional, optional polymers are homopolymers or interpolymers of aliphatic α-olefins having from 2 to 20, preferably 2 to 18, more preferably 2 to 12, carbon atoms or α-olefins having from 2 to 20, preferably 2 to 18, more preferably 2 to 12, carbon atoms and containing polar groups.

Suitable aliphatic α-olefin monomers which introduce polar groups into the polymer include, for example, ethylenically unsaturated nitriles such as acrylonitrile, methacrylonitrile or ethacrylonitrile; ethylenically unsaturated anhydrides such as maleic anhydride; ethylenically unsaturated amides such as acrylamide or methacrylamide; ethylenically unsaturated carboxylic acids (both mono- and difunctional) such as acrylic acid or methacrylic acid; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate, glycidyl acrylate or glycidyl methacrylate; ethylenically unsaturated dicarboxylic acid imides, such as N-alkyl or N-aryl maleimides, such as N-phenyl maleimide. Preferably such monomers containing polar groups are acrylic acid, maleic anhydride and acrylonitrile. Halogen groups that can be included in the polymers with aliphatic c-olefin monomers include fluorine, chlorine and bromine; preferably such polymers are chlorinated polyethylenes (CPEs) or polyvinyl chloride.

Preferred are chlorinated polyethylenes, ethylene/methyl methacrylate polymers, ethylene/acrylic acid copolymers or polyvinylchlorides.

Suitable examples of homopolymers or interpolymers of aliphatic α-olefins having from 2 to 20 carbon atoms are homopolymers of ethylene or propylene, such as isotactic polypropylene, and interpolymers of ethylene and one or more α-olefins having from 3 to 8 carbon atoms, such as ethylene-propylene interpolymers, ethylene-1-octene interpolymers, propylene-ethylene random interpolymers; interpolymers of propylene and at least one α-olefin containing from 4 to about 8 carbon atoms, terpolymers of ethylene, propylene and a diene, or rubber-toughened polypropylene. Preferred comonomers include 1-butene, 4-methyl-1-pentene, 1-hexene, and 1-octene. The olefinic polymer may also contain, in addition to the α-olefin, one or more non-aromatic monomers interpolymerizable therewith, such as $C_4$–$C_{20}$ dienes, preferably butadiene or 5 ethylidene-2-norbornene.

Classes of useful olefinic polymers are generally long chain branched low density polyethylenes (LDPE), homogeneous or heterogeneous linear low density polyethylenes (LLDPE), linear high density polyethylenes (HDPE) or substantially linear olefin polymers (SLOP), as disclosed in U.S. Pat. Nos. 5,380,810; 5,272,236 and 5,278,272. Their melt index 12 according to ASTM D 1238 Procedure A, condition E, preferably is from 0.05 to 100 g/10 min., more preferably from 0.1 to 50 g/10 min., most preferably from 1 to 20 g/10 min. The olefinic polymers may be grafted.

The polymer composition of the present invention further comprises a foaming agent which is effective to render the composition foamable. Useful blowing agents include decomposable chemical blowing agents. Such chemical blowing agents decompose at elevated temperatures to form gases or vapors to blow the polymer composition into foam form. The agent preferably takes a solid form so it may be easily dry-blended with the polymer material. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, N,N'-dinitrosopentamethylenetetramine, 4—4-oxybis (benzenesulfonylhydrazide), trihydrazino triazine, sodium bicarbonate and citric acid. Azodicarbonamide is preferred. Additional teachings to chemical blowing agents are seen in F. A. Shutov, "Polyolefin Foam", *Handbook of Polymer Foams and Technology*, pp. 382–402, D. Klemper and K. C Frisch, Hanser Publishers, Munich, Vienna, New York, Barcelona (1991). The chemical blowing agent is preferably blended with the polymer material in an amount sufficient to evolve 0.2 to 5.0, preferably from 0.5 to 3.0, and most preferably from 1.0 to 2.50 moles of gas or vapor per kilogram of polymer.

In some processes for making the present foam, a physical blowing agent may be used. Physical blowing agents include organic and inorganic agents. Suitable inorganic blowing agents include carbon dioxide, nitrogen, argon, water, air, nitrogen, and helium. Organic blowing agents include aliphatic hydrocarbons having 1–9 atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. The amount of blowing agent incorporated into the polymer melt material to make a foam-forming polymer gel is preferably from 0.2 to 5.0, more preferably from 0.5 to 3.0, and most preferably from 1.0 to 2.50 moles per kilogram of polymer.

In addition, a nucleating agent may be added in the polymer composition in order to control the size of foam cells. Preferred nucleating agents include inorganic substances such as calcium carbonate, talc, clay, titanium oxide, silica, barium sulfate, diatomaceous earth or mixtures of citric acid and sodium bicarbonate, and the like. The amount of nucleating agent employed typically ranges from 0.01 to 5 parts by weight per hundred parts by weight of a polymer resin.

A stability control agent may be added to enhance dimensional stability of the present foam. Preferred agents include amides and esters of $C_{10-24}$ fatty acids. Such agents are seen in U.S. Pat. Nos. 3,644,230 and 4,214,054, which are incorporated herein by reference. Most preferred agents include stearyl stearamide, glycerol monostearate, and sorbitol monostearate. Typically, such stability control agents are employed in an amount ranging from 0.1 to 10 parts per hundred parts of the polymer.

The polymer composition of the present invention may further contain a cross-linking agent. Possible cross-linking agents include peroxides, azides, silanes, phenols, sulfur-containing compounds, such as dithiocarbamates; thiazoles, imidazoles, sulfenamides and thiuramidisulfides; aldehyde-amine reaction products, ureas, guanidines; xanthates; paraquinonedioxime; dibenzoparaquinonedioxime, and combinations thereof. Such cross-linking agents are described in Encyclopedia of Chemical Technology, Vol. 17, 2nd edition, Interscience Publishers, 1968; and in Organic Peroxides, Daniel Seern, Vol. 1, Wiley-Interscience, 1970). In the case of substantially random interpolymers a1) not including an optional diene component, peroxide or azide cross-linking agents are preferred; in the case of interpolymers a1) with a styrene content of more than 50 weight percent azide cross-linking agents are preferred; and in the case of interpolymers a1) including an optional diene component sulfur-based and phenolic cross-linking agents are preferred.

Examples of useful organic peroxides include dicumyl peroxide, t-butylisopropylidene peroxybenzene, 1,,-di-t-butyl peroxy-3,3,5-trimethylcyclohexane, 2,5dimethyl-2,5-di(t-butyl peroxy) hexane, t-butyl-cumyl peroxide, di-t-butyl peroxide, and 2,5-dimethyl-2,5-di-(t-butyl peroxy) hexyne. Dicumyl peroxide and di-(tert-butylperoxy) di isopropyl benzene are preferred. Additional teachings regarding organic peroxide cross-linking agents are available in the *Handbook of Polyme, Foams and Technology*, pp. 198–204, supra. Suitable azides include azidoformates, such as tetramethylenebis(azidoformate); aromatic polyazides, such as 4,4'-diphenylmethane diazide; and sulfonazides, such as p,p'-oxybis(benzene sulfonyl azide). Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group.

The preferred gel level is at least 40% percent, more preferably at least 50% percent, most preferably at least 80% percent, based on the total weight of the polymers in the composition. Cross-linking agents may be added pure or in the form of a concentrate. The active component of the cross-linking agent employed to reach this gel level is generally at least 0.1 percent, typically at least 0.25 percent, often at least 0.5 percent, and generally up to 10 percent, preferably up to 6 percent, more preferably up to 3 percent, based on the total weight of the polymers in the composition.

Cross-linking may be promoted with a catalyst, such as organic bases, carboxylic acids, and organometallic compounds including organic titanates and complexes or carboxylates of lead, cobalt, iron, nickel, zinc and tin.

Rather than employing a chemical cross-linking agent, cross-linking may be effected by use of radiation. Useful radiation types include electron beam or beta ray, gamma rays, X-rays, or neutron rays. Radiation is believed to effect cross-linking by generating polymer radicals which may combine and cross-link. Additional teachings concerning radiation cross-linking are seen in C. P. Park, "Polyolefin Foam" Chapter 9, Handbook of Polymer Foams and Technology, D. Klempner and K. C. Frisch, eds., Hanser Publishers, New York (1991), pages 198–204, which is incorporated herein by reference.

The polymer composition may contain one or more further additives, for example inorganic fillers, antioxidants, colorants, pigments, light stabilizers, optical whitening agents, acid scavengers, ultraviolet absorbers, plasticizers, processing aids, ignition resistant additives, viscosity modifiers, antistatic additives or extrusion aids in known amounts.

The present foamable polymer composition may be prepared by blending one or more interpolymers a1) and/or a2) and optional polymer component(s) with one or more polydiorganosiloxanes b), one or more foaming agents c) and optional additives, in any suitable mixing device. The mixing temperature generally is from 80° C. to 230° C., preferably from 100° C. to 200° C., more preferably from 130° C. to 180° C. The interpolymer a1) and/or a2) and the polydiorganosiloxane b) and optional polymer component (s) can be directly combined in such an amount to produce a composition which preferably comprises from about 0.01 to about 20 weight percent, more preferably from about 0.1 to about 10 weight percent, and most preferably from about 0.5 to about 5 weight percent of one or more polydiorganosiloxanes b), based on the total weight of the polymers in the composition. Alternatively, a concentrate (masterbatch) of the polydiorganosiloxane b) in the above-described interpolymer a1) or a2) or in another thermoplastic polymer, such as the above-described low density polyethylene (LDPE), can be prepared and subsequently diluted with the interpolymer a1) and/or a2). The concentrates preferably comprise from 5 to 70 weight percent, more preferably from 25 to 60 weight percent of the polydiorganosiloxane b), based on the total weight of the concentrate. Once the components are relatively homogeneously dispersed within the polymer, the resulting mix is processed to foam. Useful processing temperatures generally are from 120° C. to 250° C., preferably from 150° C. to 230° C., more preferably from 160° C. to 210° C.

The foam structure which is prepared from the foamable polymer composition of the present invention may take any physical configuration known in the art, such as sheet, plank, injection molded articles, or foam slab stock. Other useful forms are expandable or foamable particles, moldable foam particles, or beads, and articles formed by expansion and/or coalescing and welding of those particles. Foams which are at a least partially cross-linked are preferred. The most preferred foams are injection-molded, cross-linked foams. The foam is particularly useful as a footwear component.

Excellent teachings to processes for making foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991).

In one embodiment of this invention, the foamable polymer blend comprising a decomposable chemical blowing agent and optionally a cross-linking agent is prepared and extruded through a die, optional cross-linking is induced and the extruded melt polymer material is exposed to an elevated temperature to release the blowing agent to form the foam structure. The polymer material and the chemical blowing agent may be mixed and melt blended by any means known in the art such as with an extruder, mixer, or blender. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature, typically, from 150° C. to 250° C. to form a foam structure. If radiation cross-linking is used, the foamable structure is irradiated to cross-link the polymer material, which is then expanded at the elevated temperature as described above.

A preferred method is the production of foamed molded parts by injection molding. Alternatively, the foamable melt polymer material can be coated onto a substrate, such as a fabric by calendering at a temperature below that required for foaming the polymer melt; and the coated substrate can be foamed at the foaming temperature or higher.

The present foamable polymer composition may also be formed into optionally cross-linked foam beads suitable for molding into articles. To make the foam beads, discrete resin particles such as granulated resin pellets are suspended in a liquid medium in which they are substantially insoluble such as water; impregnated with a blowing agent and optionally a cross-linking agent at an elevated pressure and temperature in an autoclave or other pressure vessel; and rapidly discharged into the atmosphere or a region of reduced pressure to expand to form the foam beads. A version is that the polymer beads are impregnated with blowing agent, cooled down, discharged from the vessel, and then expanded by heating or with steam. Blowing agent may be impregnated into the resin pellets while in suspension or, alternately, in non-hydrous state. The expandable beads are then expanded by heating with steam and molded by the conventional molding method for the expandable foam beads.

The foam beads may then be molded by any means known in the art, such as charging the foam beads to the mold, compressing the mold to compress the beads, and heating the beads to effect coalescing and welding of the beads to form the article. Optionally, the beads may be pre-heated with air or other blowing agent prior to charging to the mold.

The foam beads can also be prepared by preparing the foamable polymer composition, form the mixture into pellets, and heat the pellets to expand and optionally cross-link.

The density of the produced foam preferably is from 100 to 700 kg/m$^3$, more preferably from 200 to 600 kg/m$^3$, most preferably from 250 to 500 kg/m$^3$.

The foamable polymer compositions of the present invention may be used for making foamed fabricated articles requiring good wear resistant properties, such coated fabrics, artificial leather, wire and cable, wheels for bicycles, wheel chairs and strollers, and particularly for producing footwear, especially shoe soles. When the fabricated article is a laminate, the layer comprising the polymer composition of the present invention is generally applied on the outer surface of the laminate.

By incorporating an above-described polydiorganosiloxane b) into the foam, the abrasion resistance of such foam can be significantly improved. The abrasion, measured according to the DIN 53516 test method, of the foam of the present invention incorporating the polydiorganosiloxane b) is generally at least 20 percent smaller, preferably at least 35 percent smaller, more preferably at least 50 percent smaller than that of a comparable foam not including the polydiorganosiloxane b). It has been surprisingly found that such increase in abrasion resistance is generally achieved without reduction of the coefficient of friction in grip tests under dry and/or wet conditions. It has even more surprisingly been found that in the preferred embodiments of the present invention the coefficient of friction of the foam incorporating the polydiorganosiloxane b) is even higher in grip tests under dry and/or wet conditions than a comparable foam which does not comprise a polydiorganosiloxane b).

It has also been found that the polymer composition of the present invention is highly suitable for injection molding and cross-linking processes. It has been found that the polymer composition of the present invention displays reduced sticking to molds, requiring a significantly reduced amount of mold release agents, and hence yielding a significantly reduced number of parts with insufficient quality.

The following examples are provided to illustrate the present invention. The examples are not intended to limit the scope of the present invention and they should not be so interpreted. Amounts are in weight parts or weight percentages unless otherwise indicated.

EXAMPLES 1 TO 5 AND COMPARATIVE EXAMPLES A TO E

Testing

The properties of the polymers and blends are determined by the following test procedures.

Melt Index (MI) is determined by ASTM D-1238 (1979), Condition E (190° C.; 2.16 kg), unless otherwise indicated.

DIN Abrasion resistance is measured according to DIN 53516. The abrasion is indicated in mm$^3$. The smaller the abrasion number, the better is the abrasion resistance.

PFI Abrasion resistance is measured according to the abrasion test from PFI "Testing and Research Institute for the Shoe Manufacturing Industry" in Pirmesens—Germany. The abrasion is indicated in units of $\frac{1}{100}$ mm. The smaller the abrasion number, the better is the abrasion resistance.

In the dynamic Coefficient of Friction or grip test, the tangential force is measured in Kg-f (1 Kg-f corresponds to 9.8 Newton), which is required to move a weight of 2.04 kg along a wet or dry surface with a contact surface area of 400 mm$^2$.

Preparation of Ethylene/Styrene Interpolymers ESI-1 and 2

The interpolymer is prepared in a continuously operating loop reactor (36.8 gal, 140 L). An Ingersoll-Dresser twin screw pump provides the mixing. The reactor runs liquid full at 475 psig (3,275 kPa) with a residence time of approximately 25 minutes. Raw materials and catalyst/cocatalyst flows are fed into the suction of the twin screw pump through injectors and Kenics static mixers. The catalyst/cocatalyst is a three component system, that is a titanium catalyst, an aluminum catalyst component and a boron co-catalyst. The titanium catalyst is (1H-cyclopenta[l] phenanthrene-2-yl)dimethyl(t-butylamido)-silanetitanium 1,4-diphenylbutadiene). It is prepared as described below. The aluminum catalyst component is a commercially available modified methalumoxane Type 3A (MMAO-3A). The boron cocatalyst is tris(pentafluorophenyl)borane. The molar ratio between the boron/titanium catalyst and the aluminum/titanium catalyst is listed in Table 1A below. The twin screw pump discharges into a 2" (5 cm) diameter line which supplies two Chemineer-Kenics 10-68 Type BEM Multi-Tube heat exchangers in series. The tubes of these exchangers contain twisted tapes to increase heat transfer. Upon exiting the last exchanger, loop flow returns through the injectors and static mixers to the suction of the pump. Heat transfer oil is circulated through the exchangers' jacket to control the loop temperature probe located just prior to the first exchanger. The exit stream of the loop reactor is taken off between the two exchangers. The flow and solution density of the exit stream is measured by a micromotion.

Solvent feed to the reactor is supplied by two different sources. A fresh stream of toluene from an 8480-S-E Pulsafeeder diaphragm pump with rates measured by a micromotion flowmeter is used to provide flush flow for the reactor seals (20 lb/hr (9.1 kg/hr). Recycle solvent is mixed with uninhibited styrene monomer on the suction side of five 8480-5-E Pulsafeeder diaphragm pumps in parallel. These five Pulsafeeder pumps supply solvent and styrene to the reactor at 650 psig (4,583 kPa). Fresh styrene flow is measured by a micromotion flowmeter, and total recycle solvent/styrene flow is measured by a separate micromotion flowmeter. Ethylene is supplied to the reactor at 687 psig (4,838 kPa). The ethylene stream is measured by a micromotion mass flowmeter. A Brooks flowmeter/controller is used to deliver hydrogen into the ethylene stream at the outlet of the ethylene control valve. The ethylene/hydrogen mixture combines with the solvent/styrene stream at ambient temperature. The temperature of the entire feed stream as it enters the reactor loop is lowered to 2° C. by an exchanger with −10° C. glycol on the jacket. Preparation of the three catalyst components take place in three separate tanks: fresh solvent and concentrated catalyst/cocatalyst premix are added and mixed into their respective run tanks and fed into the reactor via variable speed 680-S-AEN7 Pulsafeeder diaphragm pumps. As previously explained, the three component catalyst system enters the reactor loop through an injector and static mixer into the suction side of the twin screw pump. The raw material feed stream is also fed into the reactor loop through an injector and static mixer downstream of the catalyst injection point but upstream of the twin screw pump suction.

Polymerization is stopped with the addition of catalyst kill (water mixed with solvent) into the reactor product line after the micromotion flowmeter measuring the solution density. A static mixer in the line provides dispersion of the catalyst kill and additives in the reactor effluent stream. This stream next enters post reactor heaters that provide additional energy for the solvent removal flash. This flash occurs as the effluent exits the post reactor heater and the pressure is dropped from 475 psig (3,275 kPa) down to 450 mmHg (60 kPa) of absolute pressure at the reactor pressure control valve. This flashed polymer enters the first of two hot oil jacketed devolatilizers. The volatiles flashing from the first devolatizer are condensed with a glycol-jacketed exchanger, passed through the suction of a vacuum pump, and are discharged to the solvent and styrene/ethylene separation vessel. Solvent and styrene are removed from the bottom of this vessel as recycle solvent while ethylene exhausted from the top. The ethylene stream is measured with a micromotion mass flowmeter. The measurement of vented ethylene plus a calculation of the dissolved gases in the solvent/styrene stream are used to calculate the ethylene conversion. The polymer and remaining solvent separated in the devolatilizer is pumped with a gear pump to a second devolatizer. The pressure in the second devolatizer is operated at 5 mmHg (0.7 kPa) absolute pressure to flash the remaining solvent. This solvent is condensed in a glycol heat exchanger, pumped through another vacuum pump, and exported to a waste tank for disposal. The dry polymer (<1000 ppm total volatiles) is pumped with a gear pump to an underwater pelletizer with 6-hole die, pelletized, spin-dried, and collected in 1000 lb (454 kg) boxes.

TABLE 1A

| Polymer | molar ratio boron/Ti catalyst | Molar ratio Al/Ti catalyst |
|---|---|---|
| ESI-1 | 5.5:1 | 9.0:1 |
| ESI-2 | 4.4:1 | 16:1 |

Preparation of the Titanium Catalyst: (1H-cyclopenta[1]phenanthrene-2-yl)dimethyl(t-butylamido)-silanetitanium 14-diphenylbutadiene)

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3) Preparation of (1H-cyclopenta[1]phenanthrene-2-yl)dimethyl(t-butylamino)silane To a 500 ml round bottom flask containing 1.98 g (0.0064 mole) of (1H-cyclopenta[1]phenanthrene-2-yl)dimethylchlorosilane and 250 ml of hexane was added 2.00 ml (0.0160 mole) of t-butylamine. The reaction mixture was allowed to stir for several days, then filtered using diatomaceous earth filter aid (Celite™) washed twice with hexane. The product was isolated by removing residual solvent under reduced pressure. The isolated yield was 1.98 g (88.9 percent).

4) Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5) Preparation of (1H-cyclopenta[1]phenanthrene-2-yl)dimethyl(t-butylamidopsilanetitanium dichloride To a 250 ml round bottom flask containing 1.17 g (0.0030 mole) of $TiCl_3 \cdot 3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6) Preparation of (1H-cyclopenta[1]phenanthrene-2-yl)dimethyl(t-butylamidosilanetitanium 1,4-diphenylbutadiene To a slurry of (1H-cyclopenta[1]phenanthrene-2-yl)dimethyl(t-butylamido)silanetitanium dichloride (3.48 g, 0.0075 mole) and 1.551 gm (0.0075 mole) of 1,4-diphenylbutadiene in about 80 ml of toluene at 70° C. was added 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurred in 60 ml of mixed hexanes at about 20° C. for approximately 16 hours. The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 grams of the desired product as a dark crystalline solid.

The monomer amounts and polymerization conditions are provided in Table 1B. The polymer properties are provided in Table 1C.

TABLE 1B

| | Reactor Temp. | Solvent Flow | | Ethylene Flow | | Hydrogen Flow | Styrene Flow | | Ethylene reactor Conversion |
|---|---|---|---|---|---|---|---|---|---|
| | °C. | lb/hr | kg/hr | lb/hr | Kg/hr | SCCM* | lb/hr | kg/hr | Percent |
| ESI-1 | 115 | 608 | 276 | 105 | 48 | 849 | 54 | 24.5 | 91 |
| ESI-2 | 73 | 485 | 220 | 33 | 15 | 250 | 130 | 59 | 93 |

*cc/min., standardized to 1 atm (760 torr) and 0° C.

TABLE 1C

| Inter-Polymer | Melt Index g/10 min | Styrene in ethylene/styrene Interpolymer (NMR) | |
|---|---|---|---|
| | | Mol % | Wt. percent |
| ESI-1 | 1.0 | 10.5 | 30.4 |
| ESI-2 | 1.0 | 38.9 | 70.3 |

Polymers and Additives

Additives and other polymers not already described above which are used in the Examples and Comparative Examples are listed in Table 1D below.

TABLE 1D

| Abbreviation | Description |
|---|---|
| EVA-1 | Ethylene/vinyl acetate copolymer, vinyl acetate content 28 percent by weight, 6.0 g/10 minutes (2.16 kg/190° C.) Melt Index |
| EVA-2 | Ethylene/vinyl acetate copolymer, vinyl acetate content 18 percent by weight, 2.5 g/10 minutes (2.16 kg/190° C.) Melt Index |
| $CaCO_3$ | Calcium carbonate, 3.0 micron mean particle size and no coating |
| ENGAGE 8480 polyolefin elastomer | Trademark, an elastomer commercially available from DuPont Dow being an ethylene/1-octene copolymer with a density of 0.902 g/cm³ and a 1.0 g/10 minutes (2.16 kg/190° C.) Melt Index |
| AFFINITY EG8200 polyolefin plastomer | Trademark, a plastomer commercially available from DuPont Dow being an ethylene/1-octene copolymer with a density of 0.870 g/cm³ and a 5.0 g/10 minutes (2.16 kg/190° C.) Melt Index |
| $TiO_2$ | Titanium dioxide |
| AZD | Azodicarbonamide (blowing agent) |
| ZnO | Zinc oxide powder |
| ZnSt | Zinc stearate |
| DiCup | Dicumylperoxide |
| Siloxane Masterbatch | 40 percent polydimethylsiloxane having a viscosity of 20 millions centistoke (mm²/sec) at 25° C. blended with 60 percent ESI-1 |
| Irganox 1010 | Trademark, commercially available from Ciba-Geigy |

EXAMPLES 1 AND 2 AND COMPARATIVE EXAMPLE A

A blend is produced from the following components: 50 parts of ESI-1, 50 parts of EVA-1, 1.0 parts of dicumyl peroxide, 2.0 parts of azodicarbonamide, 0.5 parts of stearic acid, 6.0 parts of zinc oxide and 500 ppm of Irganox 1010. To this blend, varying amounts of siloxane masterbatch are included in the blend such that the polysiloxane concentration is 0, 1 and 2 percent respectively, based on the total polymer weight.

A foam with a density of about 0.3 g/cm³ is produced from the blend as follows: All ingredients are mixed in a laboratory two-roll mill at about 90° C. for 8 minutes to assure good mixing. A sheet of more than 2 mm thickness is produced in the two-roll mill and is allowed to cool. The sheet is cut into strips of a weight of 27 to 30 grams. These strips are placed inside a rectangular testing open mold with a cavity of about 6 cm×10 cm×1.5 cm thick. The mold is placed inside a fast opening laboratory hot press at 180° C. and compressed to 150 bar for about 19 minutes or 1,26 min/mm thickness of the mold. The resulting polymer mixture melts and the thermally activated ingredients react, for example the peroxide agent reacts and produces a cross-linking reaction and the azodicarbonamide decomposes and liberates a gas that diffuses inside the polymer melt to induce foaming at the given pressure and temperature. When the press is then rapidly opened it causes a very fast expansion of the gas creating a cellular, foamed, cross-linked structure of about 0.3 grams/cm³ density and about 40 to 45 Shore A skin hardness.

The PFI and DIN abrasion and the coefficient of friction in a wet and dry grip test are measured and listed in Table 2 below.

TABLE 2

| Test | Comparative Example A 0 percent polysiloxane | Example 1 1 percent polysiloxane | Example 2 2 percent polysiloxane |
|---|---|---|---|
| PFI abrasion (1/100 mm) | 30.5 | 6.35 | 2.54 |
| DIN abrasion (mm³) | 444 | 303.6 | 196 |
| Dry grip (Kg-f) | 2.8 | 4.1 | 4.8 |
| Wet grip (Kg-f) | 2.8 | 2.7 | 4.2 |

The results in Table 2 illustrate the surprisingly high increase in abrasion resistance and even an increase in the coefficient of friction in the dry grip and wet grip test. These results are very surprising and highly desirable because, for example, shoe soles can be produced which have an improved abrasion resistance and at the same time even an improved coefficient of friction, which decreases the danger of slipping.

It has also been observed that the polymer composition of the present invention displays reduced sticking to molds, requiring a significantly reduced amount of mold release agents, and hence yielding a significantly reduced number of parts with insufficient quality.

EXAMPLES 3 AND 4 AND COMPARATIVE EXAMPLE B

A blend is produced from 60 parts of EVA-2, 20 parts of EVA-1, 20 parts of ENGAGE 8480 polyolefin elastomer, 9 parts of calcium carbonate, 13.6 parts of titanium dioxide, 36 parts of reprocessed ethylene vinylacetate, 2.7 parts of azodicarbonamide blowing agent, 0.09 parts of zinc oxide, 1.95 parts of di-(tert-butylperoxy) di isopropyl benzene, commercially available under the trademark Luperox F, and 1.3 parts of stearic acid. Varying amounts of the above-listed polysiloxane masterbatch are included in the blend that the polysiloxane concentration is 0, 0.8, and 4 percent respectively, based on the total polymer weight. Following the blending and foaming technique as described in Example 1, a foam of a density of about 0.3 g/cm³ is produced from the blend.

The PFI abrasion is listed in Table 3 below.

TABLE 3

| Test | Comparative Example B 0 percent polysiloxane | Example 3 0.8 percent polysiloxane | Example 4 4 percent polysiloxane |
|---|---|---|---|
| PFI abrasion (1/100 mm) | 99.22 | 63.6 | 21.2 |
| Hardness (Shore A) | 55 | 57 | 54 |
| Density (g/ccm³) | 0.317 | 0.316 | 0.304 |
| Dynamic deformation (%) PFI | 7.62 | 9.2 | 10.02 |
| Shrink (width/length) (%) | (1.6/2.05) | (2.07/2.34) | (3.32/3.37) |

EXAMPLE 5 AND COMPARATIVE EXAMPLES C TO E

A foam with a density of about 0.3 g/cm³ is produced as follows: All ingredients listed in Table 4 below are compounded in a Buss Compounder unit MDK/E46 at 110° C. and pelletized.

The pelletized composition is injection molded in a mold with the dimensions of 220 cm×150 cm×0.8 cm at 100° C. with a Main Group Injection Molding machine Model E166S, specially conditioned with a fast press device for cross-linked foams processing. Injection molded material is cured in the mold at 170° C. for a period of 400 seconds. At this temperature ingredients of the composition are activated and react. The peroxide agent reacts and produces a cross-linking reaction and the azodicarbonamide decomposes and liberates a gas that diffuses inside the polymer melt to induce foaming at the given pressure and temperature. When the press is then rapidly opened it causes a very fast expansion of the gas creating a cellular, foamed, cross-linked structure of about 0.3 grams/cm$^3$ density and about 45 to 55 Shore A skin hardness.

The samples of Comparative Examples D and E are injection molded in the same equipment, but are not cross-linked and not foamed. The injection molding temperature is 120° C. and the mold is maintain between 30 to 40° C. since a cross-linking process is not required.

The scuffing resistance tests in Example 5 and Comparative Examples C to E measure how much material is lost when a sample passes over a PVC flooring called "Target Standard" produced and sold by Target Somber AB, Sweden, 6 times with a load of 9 kg over an area of 40 mm$^2$ at 2.2 N/MM. pressure. The used friction apparatus is equipped with an abrasive paper of roughness P600 which is fixed in such a manner that the sample first slides over the abrasive paper over a distance of 2 cm before it slides over the flooring sheet. The sample to be tested has a surface of 5 mm×8 mm that is subjected to abrasion testing and a 5 height or 4 cm whereof 4 mm protrudes out from the holder of the friction apparatus. The sample is weighed before and after the scuffing resistance test. The weight loss is recorded. The test is repeated 3 times.

TABLE 4

| (Comparative) Example | 5 | C | D | E |
|---|---|---|---|---|
| Composition (weight parts) | | | | |
| EVA-2 | 47, 5 | 50 | | |
| ESI-1 | 47, 5 | 50 | | |
| Affinity EG8200 | | | 100 | 95 |
| Siloxane Masterbatch | 5 | | | 5 |
| AZD | 2, 3 | 2, 3 | | |
| Dicumyl peroxide | 4, 2 | 3, 7 | | |
| ZnO | 1 | 1 | | |
| ZnSt | 1 | 1 | | |
| TiO2 | 2 | 2 | | |
| CaCO3 | 5 | 5 | | |
| Irganox 1010 | 0, 1 | 0, 1 | | |
| Weight loss in abrasion tests (mg) | 8–10 | 3–5 | 36–40 | 20–24 |

The results in Table 5 illustrate the excellent scuffing resistance of foams prepared from the polymer composition of the present invention. The excellent results are confirmed in wearing tests with shoes having soles prepared from a foam of the present invention. In contrast thereto, the samples of Comparative Examples D and E have a much greater weight loss. As a general rule, samples with a weight loss of more than about 15 mg in the above-mentioned test are not suitable for as soling materials for shoes.

What is claimed is:

1. A foamable polymer composition comprising
   a1) a substantially random interpolymer produced from i) one or more α-olefin monomers and ii) one or more vinyl or vinylidene aromatic monomers and/or one or mare sterically hindered aliphatic or cycloaliphatic vinyl or vinylidene monomers, and optionally iii) other polymerizable ethylenically unsaturated monomer(s), or
   a2) an interpolymer comprising polymerized units of ethylene and vinyl acetate or
   a3) a combination of the polymers a1) and a2); and
   b) a polydiorganosiloxane having a viscosity of at least one million centistoke at 25° C.; and
   c) a foaming agent.

2. The polymer composition of claim 1 wherein the polydiorganosiloxane b) contains at least one hydroxyl group, amine group or vinyl group.

3. The polymer composition of claim 1 wherein the polydiorganosiloxane b) is a polydimethylsiloxane.

4. The polymer composition of claim 1 comprising from about 0.01 to about 20 weight percent of the polydiorganosiloxane b), based on the total weight of the polymers in the composition.

5. The polymer composition of claim 1 comprising from 15 to 85 weight percent of the substantially random interpolymer a1) and from 85 to 15 weight percent of the interpolymer a2), the weight percentages being based on the total weight of the polymers a1) and a2).

6. The polymer composition of claim 1 wherein the substantially random interpolymer a1) contains interpolymerized
   (i) from 35 to 99.5 mole percept of one or more α-olefin monomers and
   (ii) from 65 to 0.5 mole percent of one or more vinyl or vinylidene aromatic monomers and/or one or more sterically hindered aliphatic or cycloaliphatic vinyl or vinylidene monomers, and
   optionally iii) other polymerizable ethylenically unsaturated monomer(s).

7. The polymer composition of claim 1 wherein the substantially random interpolymer a1) is an interpolymer of ethylene and styrene or an interpolymer of ethylene, styrene and at least one α-olefin containing from 3 to 8 carbon atoms.

8. The polymer composition of claim 1 wherein the interpolymer a2) is an ethylene/vinyl acetate copolymer wherein the vinyl acetate content is from 4 to 40 percent, based on the total polymer weight.

9. The polymer composition of claim comprising up to 70 weight percent of one or more further polymeric components, based on the total weight of the polymers in the composition.

10. The polymer composition of claim 1 wherein said one or more further polymeric component is selected from the group consisting of styrene-butadiene rubbers, grafted polyethylenes, chlorinated polyethylenes, ethylene/acrylic acid copolymers, ethylene/methylmethacrylate copolymers, styrene-butadiene-styrene block copolymers, polystyrenes, high impact polystyrene, polyvinylchlorides, polybutadienes and polyisoprenes.

11. The polymer composition of claim 1 wherein the amount of the blowing agent c) is from 0.2 to 5 moles per kilogram of polymers.

12. The polymer composition of claim 1 wherein the blowing agent is an azodicarbonamide, azodiisobutyronitrile, benzenesulfonhydrazide, 4,4-oxybenzene sulfonylsemicarbazide, p-toluene sulfonyl semi-carbazide, barium azodicarboxylate, N,N'-dimethyl-N,N'-dimtrosoterephthalamide, N,N'-oxybenzene sulfonylsemicarbazide, p-toluene sulfonyl semi-carbazide, barium azodicarboxylate, N,N'-dimethyl-N,N'-dinitrosoterephthalamide, N,N'-dinitrosopentamethylenetetramine, 4—4-oxybis (benzenesulfonylhydrazide), trihydrazino triazine, sodium bicarbonate or citric acid.

13. The polymer composition of claim 1 further comprising a crosslinking agent.

14. A foam comprising
- a1) a substantially random interpolymer produced from i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s), or
- a2) an interpolymer comprising polymerized units of ethylene and vinyl acetate or
- a3) a combination of the polymers a1) and a2); and
- b) a polydiorganosiloxane having a viscosity of at least one million centistoke at 25° C.

15. The foam of claim 14 being at least partially crosslinked.

16. The foam of claim 15 being injection-molded.

17. A fabricated article comprising the foam of claim 14.

18. The fabricated article of claim 17 in the form of footwear.

* * * * *